US00H002065H

(19) United States

(12) Statutory Invention Registration (10) Reg. No.: US H2065 H

Hong et al. (43) Published: May 6, 2003

(54) PROXY SERVER

(75) Inventors: Kevin Hong, St. Paul, MN (US); Vidyasagaran Parameswaran Nair, Bangalore (IN)

(73) Assignee: Multi-Tech Systems, Inc., Mounds View, MN (US)

(21) Appl. No.: 09/221,742

(22) Filed: Dec. 28, 1998

(51) Int. Cl.[7] ..... G06F 15/173

(52) U.S. Cl. ..... 709/226; 709/230; 709/238

(58) Field of Search ..... 709/219, 217, 709/227, 229, 245, 246, 249, 203, 226, 230, 238

(56) References Cited

U.S. PATENT DOCUMENTS

| | | | | | |
|---|---|---|---|---|---|
| 5,371,852 | A | * | 12/1994 | Attanasio et al. | 709/245 |
| 6,035,020 | A | * | 3/2000 | Weinstein et al. | 379/93.09 |
| 6,038,594 | A | * | 3/2000 | Puente et al. | 709/217 |
| 6,091,737 | A | * | 7/2000 | Hong et al. | 370/431 |
| 6,115,755 | A | | 9/2000 | Krishan | 709/250 |
| 6,157,950 | A | * | 12/2000 | Krishnan | 709/223 |
| 6,182,141 | B1 | * | 1/2001 | Blum et al. | 709/227 |
| 6,185,625 | B1 | * | 2/2001 | Tso et al. | 709/247 |
| 6,243,379 | B1 | | 6/2001 | Veerina et al. | 370/389 |
| 6,253,247 | B1 | | 6/2001 | Bhaskar et al. | 709/237 |
| 6,282,193 | B1 | | 8/2001 | Hluchyj et al. | 370/356 |

* cited by examiner

*Primary Examiner*—Michael J. Carone

(74) *Attorney, Agent, or Firm*—Schwegman, Lundberg, Woessner & Kluth, P.A.

(57) ABSTRACT

A proxy server shares a plurality of modems connected to a wide area network among multiple client computers connected to a local area network. Each of the client computers on the local area network is assigned a local address while each of the plurality of modems is assigned a modem port address valid on the wide area network. In one embodiment, a processor controls address substitution allowing multiple client computers to share modems when communicating to host computers in a wide area network. The processor creates a descriptor list to keep track of the connections between the client computer and host computers on the wide area network and uses the descriptor list to determine to which client computer an incoming data packet should be sent. The processor also creates a proxied application list to determine if an outgoing data packet, received from one of the client computers, is one to be proxied through the proxy server.

21 Claims, 8 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROXY SERVER

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright © 1997, Multi-Tech Systems, Inc., All Rights Reserved.

FIELD OF THE INVENTION

The present invention is related to network servers and in particular to a proxy server.

BACKGROUND OF THE INVENTION

Traditionally, connecting networked computers to the Internet required establishing a dial-up connection for each network computer, or a dedicated line or frame relay connection shared by all network computers. Individual dial-up connections optimize bandwidth and connection time while a dedicated connection provides the easy extension of Internet resources to newly added network computers. Each approach has major drawbacks, however.

Each networked computer using an individual dial-up connection requires an unique account with an Internet Service Provider (ISP), its own phone line, and a modem, in addition to the hardware necessary to connect the computer to the network. The cost of the modems, phone lines, and ISP accounts quickly becomes prohibitive in a small to medium sized network.

A dedicated connection eliminates the cost burdens of individual dial-up connections since the dedicated connection utilizes the hardware necessary to connect the computer to the network. The drawbacks to a dedicated connection are the cost of the dedicated connection, the cost of the equipment necessary to connect the network to the dedicated connection, and the additional overhead associated with managing the network and securing the network from unauthorized, external access.

Therefore, there is a need to connect network computers to the Internet without incurring the cost burdens associated with either individual dial-up accounts or a dedicated connection while incorporating the benefits of both approaches.

SUMMARY OF THE INVENTION

A proxy server shares a plurality of modems connected to a wide area network among multiple client computers connected to a local area network. The proxy server comprises the plurality of modems, a local port connected to the local area network, and a processor connected to the local port and to the modems. Each of the client computers on the local area network is assigned a local address while each of the modems is assigned a modem port address. The local port receives outgoing local packets destined for the wide area network from the client computers and sends incoming local packets from the wide area network to the client computers. The modems transmit outgoing remote packets and receive incoming remote packets to and from the wide area network. When the processor receives an outgoing local packet from one of the client computers through the local port, the processor selects one of the modems and substitutes the modem port address of the selected modem for the local address of the client computer in the outgoing local packet to create an outgoing remote packet. The processor transmits the outgoing remote packet to the selected modem for transmission to the wide area network. When the processor receives an incoming remote packet from a modem, the processor determines a destination client computer for the incoming remote packet, and substitutes the local address of the destination client computer for the modem port address of the modem in the incoming remote packet to create an incoming local packet. The processor transmits the incoming local packet to the destination client computer through the local port. The processor creates a descriptor list to keep track of the connections between the client computer and host computers on the wide area network and uses the descriptor list to determine to which client computer an incoming remote packet should be sent. The processor also creates a proxied application list to determine if an outgoing local packet is one to be proxied through the proxy server.

The structure of the descriptor list and the proxied application list are described in detail as are the processes performed by proxy server software which causes the processor to perform as summarized above. Additionally, various algorithms used to select a modem are also described.

Because the proxy server shares multiple modems among the computer of a local area network, the number of phone lines, modems, and ISP accounts are greatly reduced while maintaining the benefits of using only the amount of bandwidth needed at one time associated with dial-up Internet accounts. Furthermore, the proxy server allows easy connections of new client computers to the Internet but without the overhead associated with a dedicated connection. Additionally, because the proxy server translates between non-registered local area network addresses and valid Internet addresses, the local area network is secured against unauthorized, external access.

DESCRIPTION OF THE EMBODIMENTS

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

The leading digit(s) of reference numbers appearing in the Figures corresponds to the Figure number, with the exception that the same reference number is used throughout to refer to an identical component which appears in multiple Figures. Signals and connections may be referred to by the same reference number or label, and the actual meaning will be clear from its use in the context of the description.

Figure 1A:
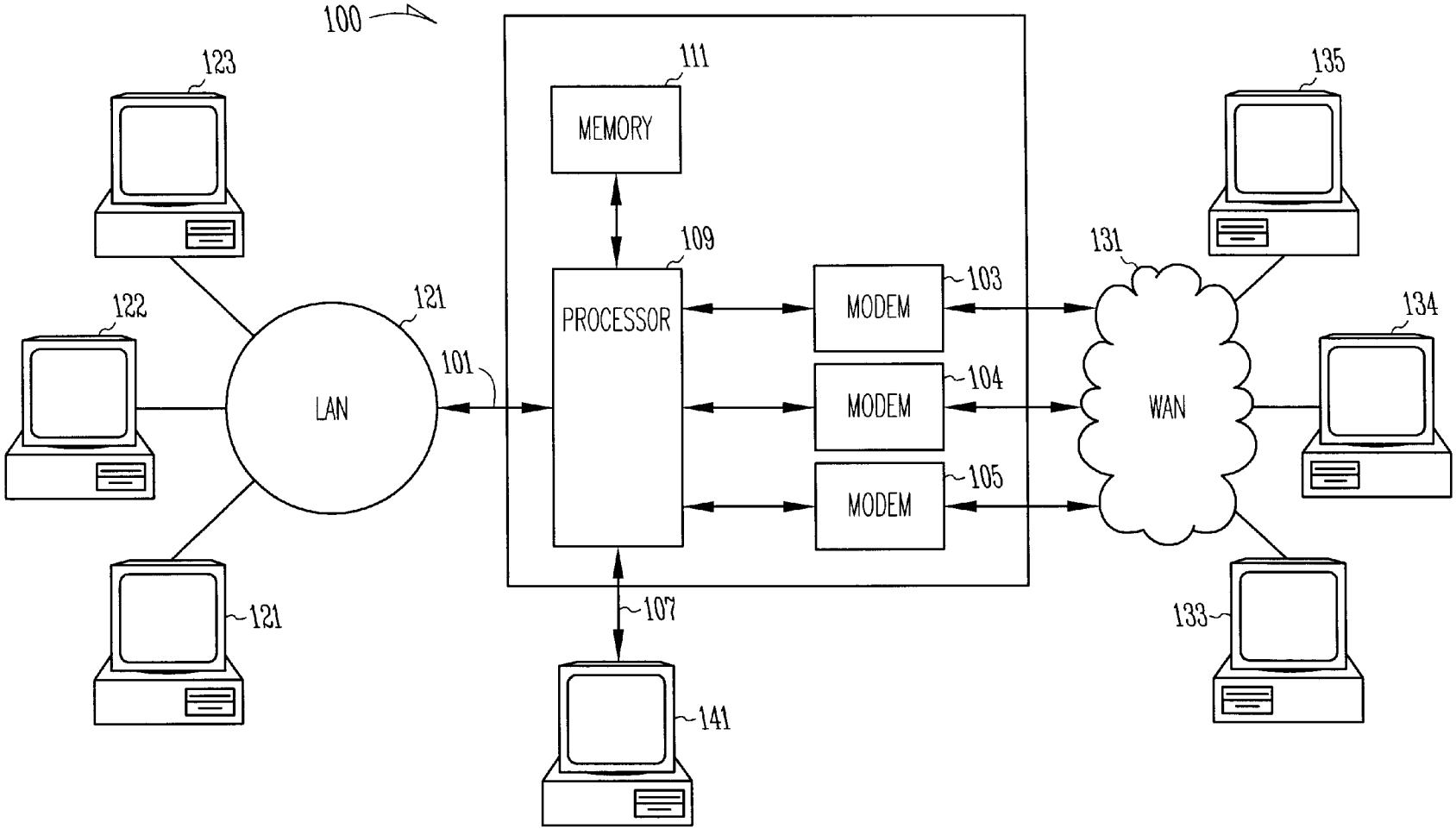
FIG. 1A is a block diagram of one embodiment of a proxy server of the present invention.
Figure 1B:
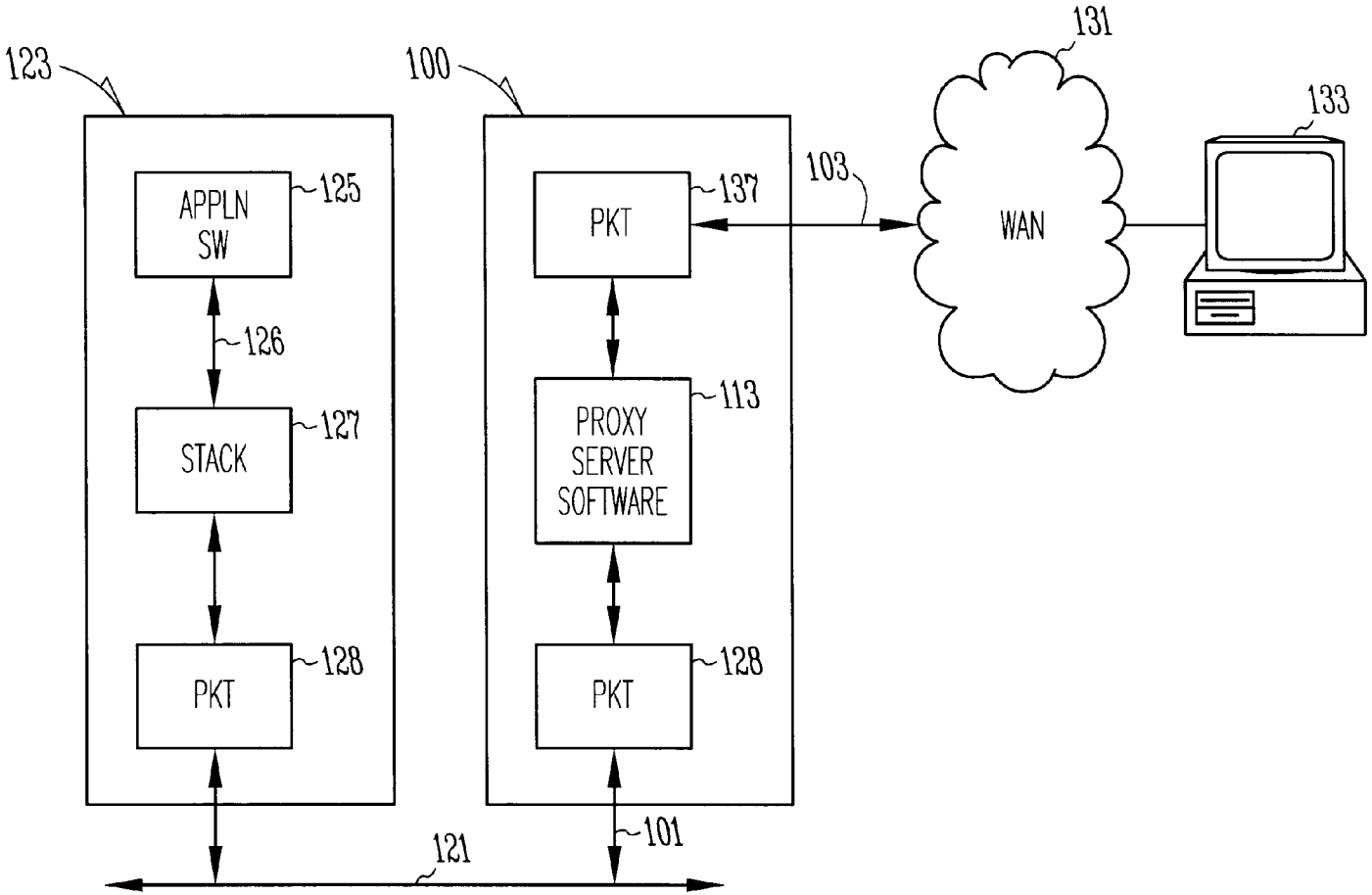
FIG. 1B is a block diagram of communications flow in the proxy server shown in FIG. 1A.
Figure 2:
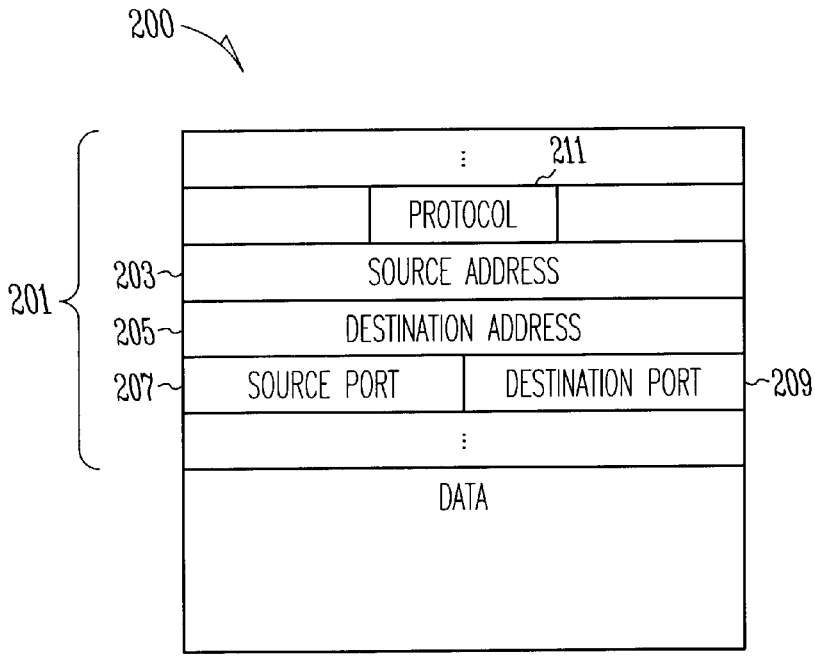
FIG. 2 is diagram of one embodiment of a packet header used by the proxy server of FIG. 1A.

An overview of one embodiment of the proxy server hardware and software is first described in reference to FIGS. 1A and 1B. The particular methods performed by an exemplary embodiment of the proxy server software are next described in detail by reference to data structure diagrams in FIGS. 2, 3 and 4, and a series of flowcharts shown in FIGS. 5x. The methods to be performed by the proxy server software constitute computer programs made up of computer-executable instructions. Describing the methods by reference to a flowchart enables one skilled in the art to develop such programs including such instructions to carry out the methods on suitable computerized servers (the processor of the server executing the instructions from computer-readable media).

Proxy Sever Overview

The embodiment of the proxy server 100 shown in FIG. 1A has a local area network (LAN) port 101, three modems 103, 104, 105 serving as wide area network (WAN) ports, a command port 107, a microprocessor 109, and memory 111. The LAN (local) port 101 connects the proxy server 100 to a local area network 121 of client computers 121, 122, 123. The modems 103–105 connect the proxy server 100 to the Internet 131 through an Internet Service Provider (ISP). The ISP assigns a valid Internet address (modem port address) to each WAN port 103–105. Proxy server software 113 (shown in FIG. 1B) executing in the microprocessor 109 manages the transfer of data packets between the client computers on the LAN 121 and host computers 133, 134, 135 on the Internet 131. The command port 107 is used to configure the proxy server through a non-network computer 141.

In an alternate embodiment, one of the WAN ports 103–105 serves as a dial-in connection so that a remote computer can connect to the proxy server 100 without being connected to the Internet. In yet another embodiment, one of the WAN ports 103–105 alternates between a dial-in connection and an ISP connection depending on predetermined parameters such as time of day and/or communication traffic.

Further alternate embodiments having more or fewer than three modems are contemplated as within the scope of the invention and the applicability of the following descriptions to such alternate embodiments will be readily apparent to one of skill in the art.

FIG. 1B illustrates a single client computer 123 on the LAN 121 connected to a host computer 133 on the Internet 121 through the WAN port 103 on the proxy server 493 100. The following descriptions are also applicable to the alternate embodiments in which the WAN port 103 serves as a dial-in connection.

When a user invokes an Internet application 125 on the client computer 123, the application 125 sends a data stream 126 to a corresponding communications protocol stack 127 on the client computer 123. For example, data streams from a World Wide Web browser or a FTP/TFTP (File Transport Protocol/Trivial File Transport Protocol) session are directed to a TCP/IP stack. The protocol stack 127 creates outgoing LAN (local) packets 128 from the data and places the LAN packets 128 on the LAN 121 for routing to their destination.

The proxy server 100 receives the LAN packets 128 on the LAN port 101 and the proxy server software 113 determines if the data in each LAN packet 128 is to be transferred to the Internet ("proxied"). Packets which are not to be proxied are discarded. Because the client computer 123 is assigned a unique LAN address which is not a valid Internet address, the proxy server 100 must translate between the LAN address of the client computer 123 and the valid Internet address of the WAN port 103 for outgoing local packets which will be proxied. After converting the outgoing LAN packet 128 to an outgoing Internet (WAN) packet 137, the proxy server software transfers the outgoing Internet (remote) packet 137 to the Internet using modem (WAN port) 103 for delivery to the host computer 133. The proxy server software 113 performs the reverse process when it receives an incoming Internet packet through WAN port 103 to create an incoming LAN packet for transmission to the appropriate client computer.

The proxy server software supports multilink operation if the ISP supports a suitable protocol such as ML-PPP (Multi Link Point to Point Protocol). The goal of multilink operation ("channel bonding") is to coordinate multiple independent communications links between a pair of systems, thus providing a virtual link with greater bandwidth than any of the constituent members. ML-PPP protocol is used to split, recombine and sequence datagrams across the multiple logical data links to bond the multiple links into a single data transmission channel.

The processes performed by the proxy server software 113 and supporting data structures are described next.

Proxy Server Software

The proxy server software 311 of FIG. 1B is next described in the general context of computer-executable instructions, such as program modules, being executed by the microprocessor 109 of proxy server 100 as shown in FIG. 1A. Although no particular structure or arrangement of program modules is required by the invention, generally the program modules include routines, programs, objects, components, data structures, etc., that perform particular tasks or implement particular abstract data types.

Each packet 200 received by the proxy server software from either the LAN 121 or the Internet 131 contains a header 201 that specifies addresses for the source 203 and destination 205 computers, and an application port, or service, number 207, 209 for the source and destination applications that will service the data in the packet. The header 201 also contains the transport protocol 211 used to transfer the packet, such as TCP (Transmission Control Protocol) for a browser or UDP (User Datagram Protocol) for FTP/TFTP. Headers for packets containing systems messages delivered between the client and source computers using the Internet Control Messaging Protocol (ICMP) do not contain source and destination port numbers as the messages are independent of any particular application.

For an outgoing TCP/IP LAN packet, the source of a packet is uniquely identified by the LAN address 203 for the originating, source, client computer, such as computer 123 in FIG. 1B, and the application source port number 207 for the application that created the packet. The destination for an outgoing TCP/UDP LAN packet is uniquely identified by an Internet destination address 205 for a host computer on the Internet, such as host computer 133 in FIG. 1B, and a application destination port number 209 on the host computer. The destination address 205, destination port number 209, LAN address 203, and source port number 207 together identify a particular application connection between the client and host computers. Similarly, the source of an ICMP LAN packet is the LAN address of the client computer, the destination is the Internet address of the host computer, and the ICMP connection is identified by the destination address and the LAN address.

The proxy server software maintains three data structures: a proxied application list 300, a descriptor list 400 of open connections, and a status list 600. Although the data structures are described as lists, one of skill in the art will readily recognize that the data structures can be embodied as relational data base tables, file records, operating system registry entries, or other well-known arrangements of data, and stored on computer-readable media of various types including random access memory, fixed disk, or CDROM.

Figure 3:
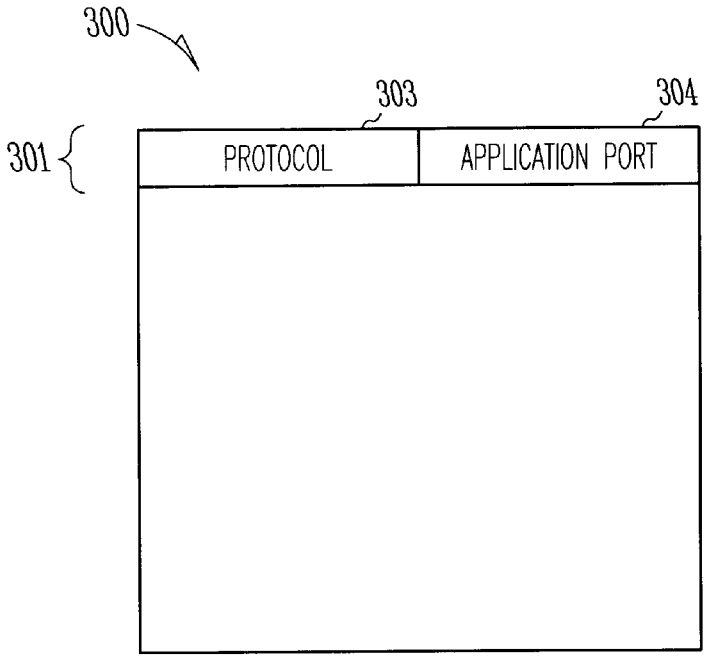
FIG. 3 is a diagram of one embodiment of a proxied application list used by the proxy server of FIG. 1A.

One embodiment of the proxied application list 300 is illustrated in FIG. 3. The application list 300 created when the proxy server software is initialized. Each entry 301 in the application list 300 contains the transport protocol 303 and the application port number 304 for an application which will be proxied through the proxy server.

Figure 4:
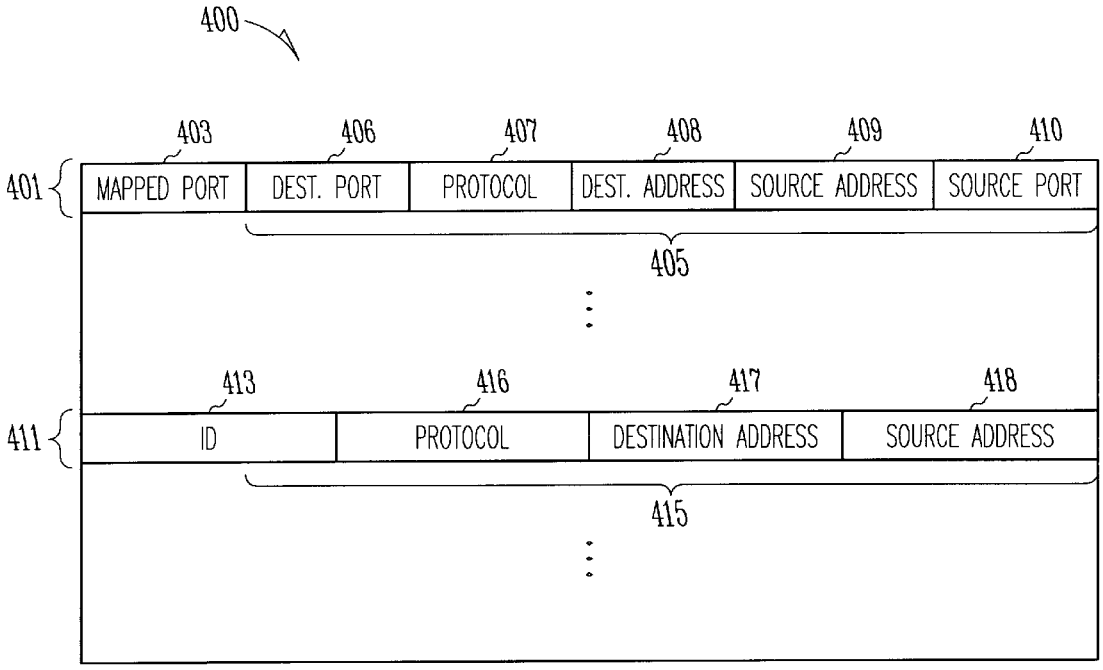
FIG. 4 is a diagram of one embodiment of a descriptor list used by the proxy server of FIG. 1A.

One embodiment of the descriptor list 400 is illustrated in FIG. 4. The descriptor list 400 contains an entry 401 for each open TCP/UDP connection. Each entry 401 is keyed on the destination port 406, transport protocol 407, destination address 408, and LAN address 409. The destination port 406, transport protocol 407, destination address 408, LAN address 409, and the source port 410, are collectively referred to as a connection descriptor 405. The descriptor list 400 also contains an entry 411 keyed on the transport protocol 416, destination address 417, and LAN address 418 for each ICMP connection, collectively shown as connection descriptor 415. The mapped port number 403 and identifier 413 shown in FIG. 4 are explained below.

Figure 5A:
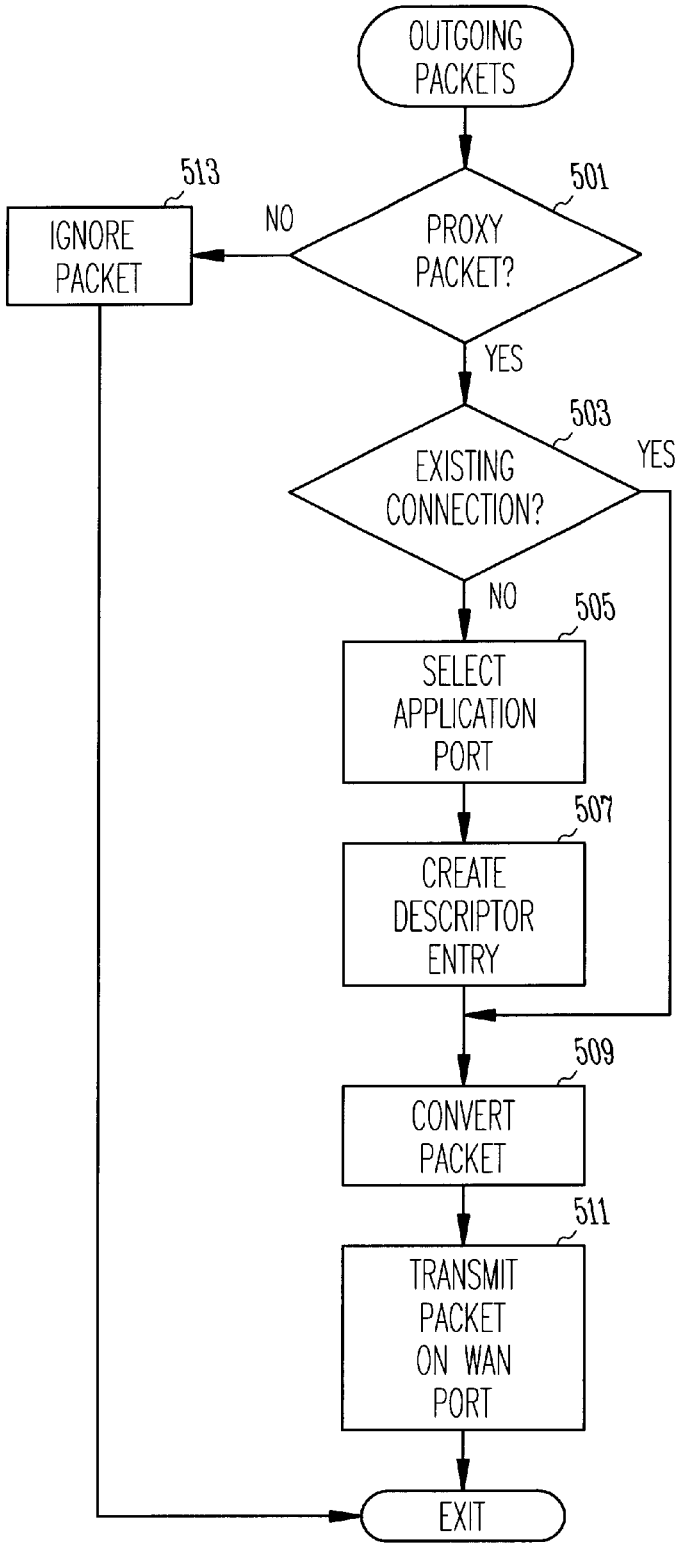
FIG. 5A is a flow chart of processes performed by the proxy server of FIG. 1A in response to receiving an outgoing packet.
Figure 5B:
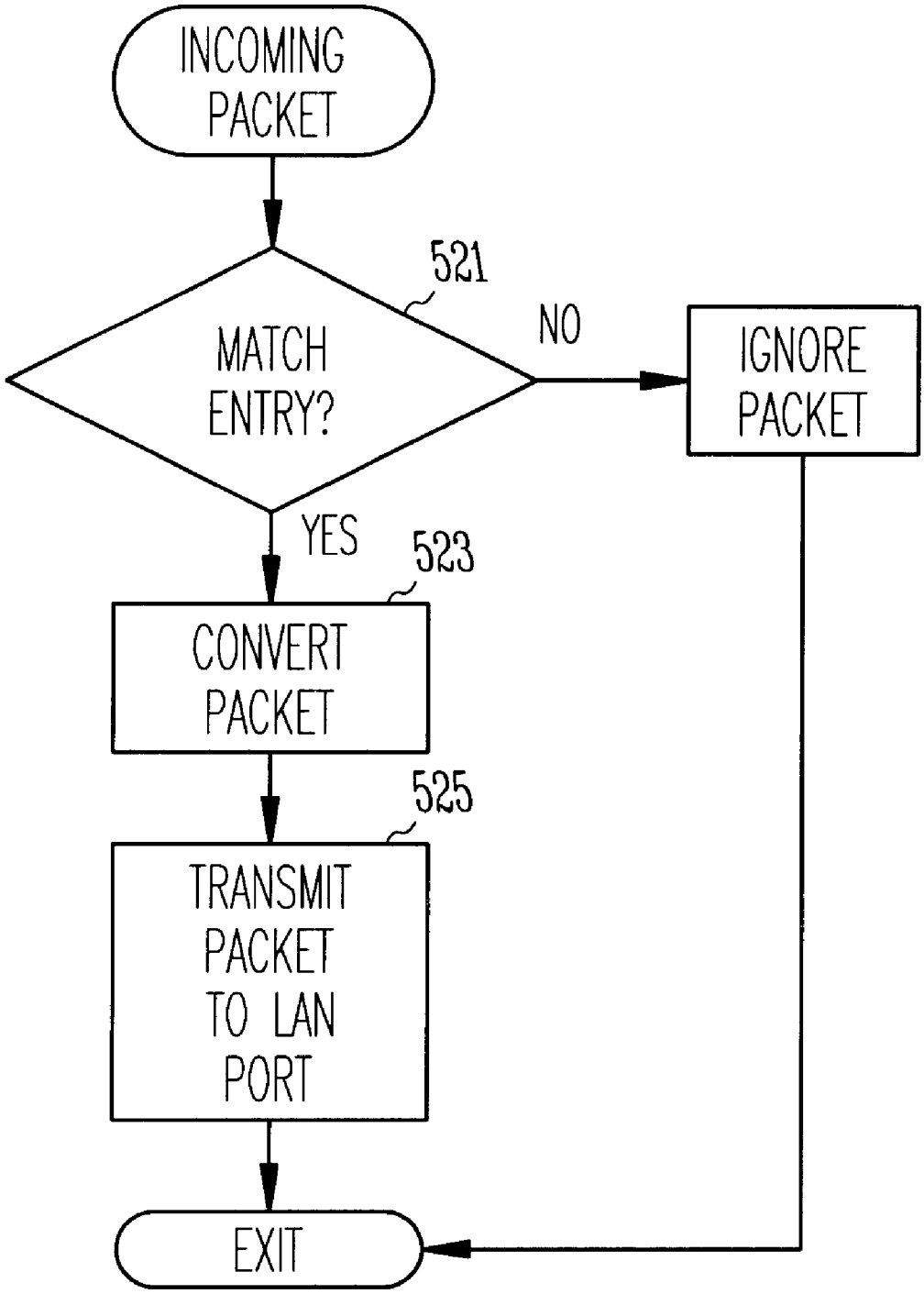
FIG. 5B is a flow chart of processes performed by the proxy server of FIG. 1A in response to receiving an incoming packet.
Figure 5C:
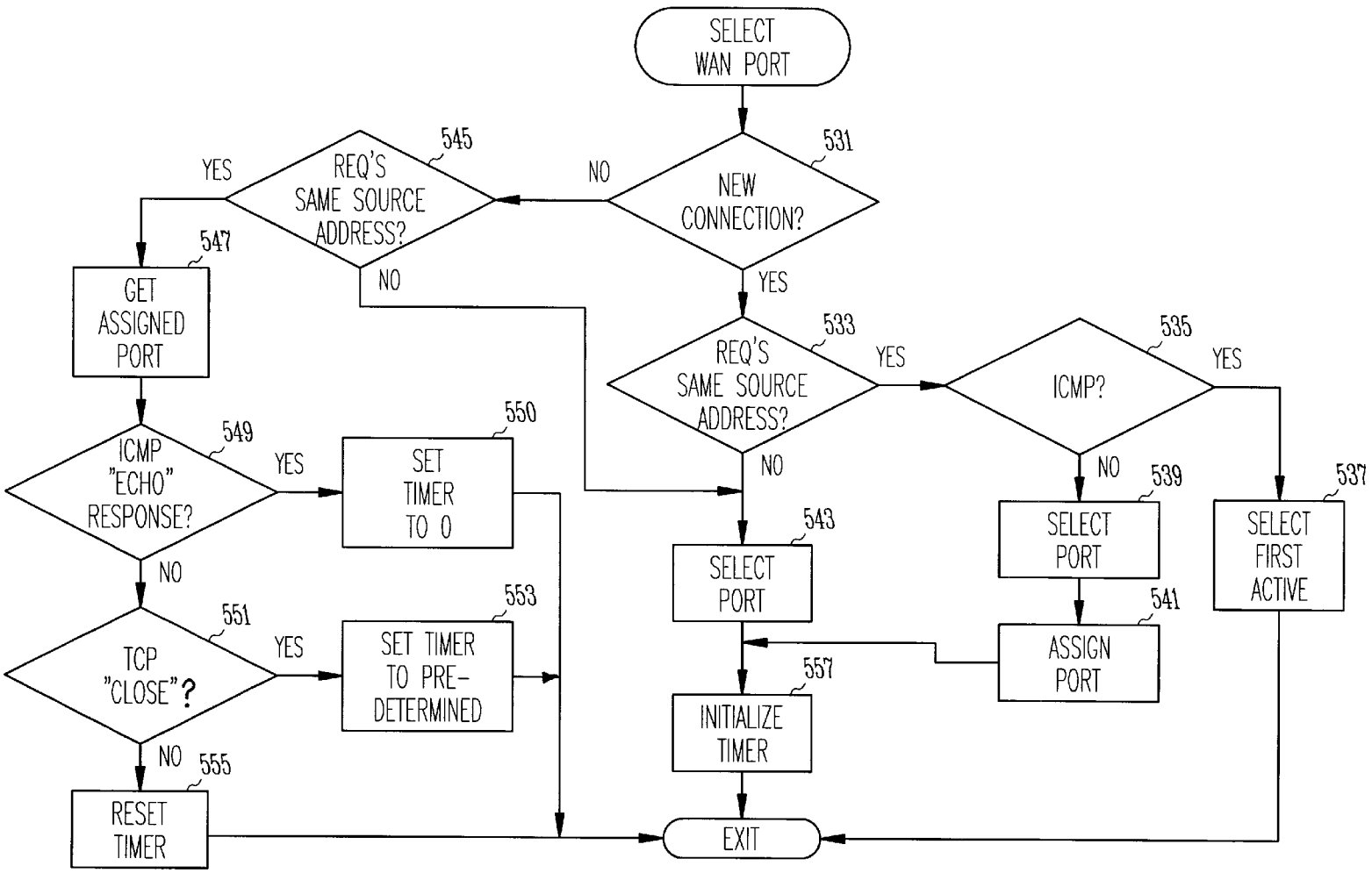
FIG. 5C is a flow chart of process performed by the proxy server of FIG. 1A to select a port for outgoing packets.
Figure 6:
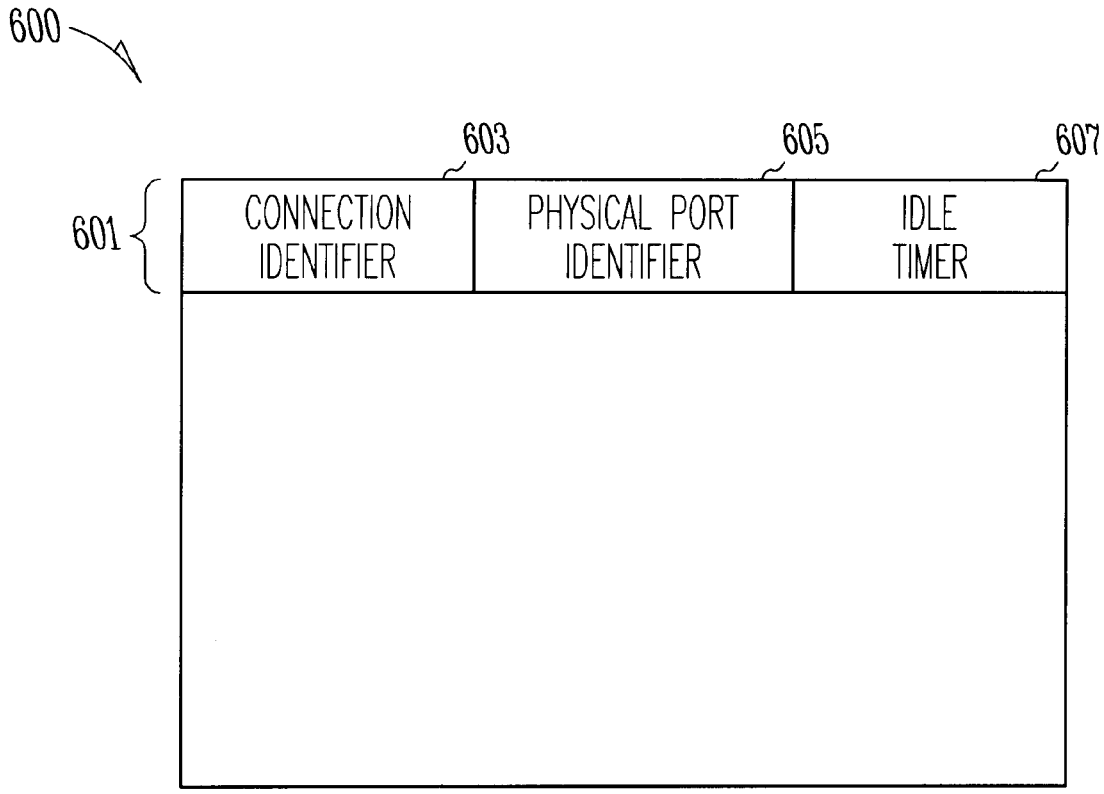
FIG. 6 is a diagram of one embodiment of a status list used by the proxy server of FIG. 1A.

One embodiment of the status list 600 is illustrated in FIG. 6 and explained in conjunction with FIGS. 5A, 5B and 5C which describe the methods or processes performed by the proxy server software. Beginning with FIG. 5A, when an outgoing LAN packet, such as packet 128 in FIG. 1B, is received by the proxy server 100, the proxy server software determines if the packet is to be proxied (step 501). For TCP/UDP LAN packets, the determination is based on comparing the entries 301 in the application list 300 against the corresponding information in the packet header 200. A match indicates that the TCP/UDP LAN packet is to be proxied. In the case of ICMP LAN packets, only packets having a message type of "echo request" will be proxied. LAN packets which are not to be proxied are ignored by the proxy server.

Once the determination is made that a LAN packet is to be proxied at step 501, the proxy server software determines whether the connection requested by a packet is an existing open connection (step 503) using the descriptor list 400 and the information contained in the packet header 200. If the corresponding information in the packet header 200 does not match a entry 401 in the descriptor list 400, the connection has not yet been opened and, therefore, must be created. However, because the combination of application port number and the LAN address in a LAN packet is valid only within the local area network, those values cannot be used to open a new connection.

Therefore, the proxy server software selects an application port number which is not reserved or in use by the proxy server (step 505). For a new TCP/UDP connection (which is not a FTP/TFTP connection), the software creates an new entry 401 in the descriptor list 400, stores the appropriate information the LAN packet header 200 as the connection descriptor 405, and inserts the selected application port number into the mapped port 403 (step 507).

If the application is FTP/TFTP, the proxy server software creates one entry 401 in the descriptor list 400 that corresponds to the connection between the client computer and the FTP/TFTP application port on the host computer, and a second entry 401 in the descriptor list 400 for the connection between the client computer and the data transfer port on the host computer.

The proxy server software also creates an entry 601 in the status list 600 for a newly opened connection. The entry 601 contains an open connection identifier 603 for the open connection, a physical port identifier 605 which identifies the physical port on which the open connection communications, and an idle timer 607.

When the appropriate entry 401 is created or matched, the LAN packet converted to an Internet packet by the proxy server software (step 509). The mapped port 403 in the entry 401 is used as the source port 207 in the packet header 200. Similarly, the proxy server software replaces the LAN address of the client computer with the Internet address of one of the WAN port 103–105 on the proxy server 100. The WAN port used for the communication is specified by the physical port identifier 605. The selection process for a WAN port is described in more detail below.

If the FTP/TFTP LAN packet contains a "PORT" command, the proxy server software also replaces the port number specified in the data portion of the packet. As will be readily apparent to one of skill in the art, such a modification can result in a change of the packet size, so the software modifies appropriate sections of the header of each packet transferred through the FTP/TFTP connection accordingly.

In the case of an ICMP packet, the proxy server software creates a new entry 411 in the descriptor list 400, stores a unique identifier 413 for the ICMP connection and the connection descriptor 415 information from the packet header 200. The identifier 413 is included in the ICMP packet at step 509. An exemplary ICMP packet is shown in Table 1 below. The identifier field shown in Table 1 is mapped before forwarding the ICMP packet to the Internet.

TABLE 1

| Type | Code | Checksum |
|---|---|---|
| Identifier | | Sequence Number |
| Optional Data | | |

Once the LAN packet has been converted to a valid Internet packet as described above, the proxy server software recomputes the appropriate checksums to complete step 509. The proxy software then transfers the converted packet to the Internet through the selected WAN port (step 511).

Because an outgoing TCP/UDP Internet packet specifies the mapped port 403 as the source port 207 in its header 200, an incoming Internet packet on the same connection will specify the mapped port 403 as the destination port 209 in its header 200. As shown in FIG. 5B, the proxy server software matches the mapped port 403 and the protocol 211 specified in the header 200 of the incoming Internet to the corresponding entry 401 in the descriptor list 400 (step 521). The proxy server software then replaces the destination address 205 and destination port 209 in the header 200 of the incoming packet with the LAN address 409 and application port 410 from the entry 401 (step 523). Similarly, the identifier in an incoming ICMP packet is used to find the corresponding entry 411 in the descriptor list 400 at step 521, and the destination address 205 in the incoming packet is replaced by the LAN address 418 from the entry 401 at step 523. The software recomputes the checksums for the packet to complete the conversion between Internet and LAN packets at step 523 and transfers the converted packet to the LAN for routing to the specified client computer (step 525).

The WAN port selection process is illustrated in FIG. 5C. In order to balance the load on the proxy's server's physical WAN ports, i.e., the modems, the proxy server software only permanently assigns a physical port to a new connection if the application, such as ICMP, requires the same source address for the life of the connection (step 533). For an ICMP connection (step 535), the proxy server software selects the first active port (step 537). For other applications that require the use of the same physical port, the proxy server selects the port with the least amount of load when the connection is initially established (step 539).

For applications that do not require the same physical port (steps 553 and 545), the proxy server software dynamically selects a port each time a packet is to be sent to the Internet (step 543). The software will select the active port with the least amount of load. A physical port which is currently not active is selected when all active ports are equally loaded. A WAN port can be inactive because, for example, it is both a dial-in and Internet connection. If all ports are active and equally loaded, the software selects the first active port.

The idle timer 607 is set to an initial value when the connection is opened (step 557). Each timer 607 is decremented by foreground process (not illustrated) each minute there is no activity on the corresponding connection. Activity on the connection resets the appropriate timer 607 to the initial value (step 555) while a TCP "close" command (step 551) sets the timer to an amount pre-determined to be adequate for the closing operations (step 553). In the case of an ICMP echo request message, the timer 607 is set to zero (step 550) when the response (step 549) is received. When a timer 607 reaches zero, the corresponding connection is closed and the descriptor entry 411 and status entry 601 are freed (not illustrated).

A physical port can be closed by either the proxy server, the ISP, or due to a failed communications link between the proxy server and the ISP. When a physical port is closed, all connections using that physical port are closed and the corresponding descriptors and status entries freed.

As described above, each client computer is assigned a unique LAN address. In one embodiment, such addresses are permanently assigned external to the proxy server. In an alternate embodiment, the proxy server software acts as a DHCP (Dynamic Host Configuration Protocol) to dynamically assign an address to a client computer when the client computer requests a connection. As the operations of a DHCP server are well known to one skilled in the art, no detailed functional description is provided.

The proxy server software also provides monitoring and management of the proxy server using a browser or Telnet program on a computer connected through the LAN port, the command port, or a WAN port. User input is received in the form of Telnet, HTTP, or FTP commands. When the microprocessor 109 recognizes that a command is addressed to the proxy server 100, not to a client or host computer, a security check is performed to ensure that the user is permitted access to the monitoring and management facilities of the proxy server software. Any results from the command are returned through the port on which the command arrived. Telnet, HTTP, and FTP commands, and the software required to support their operations, are well-known to one of skill and are, therefore, not discussed in further detail.

Proxy Server Summary

The proxy server has been described in terms of its hardware and software components, from an overview of the operation of the hardware and software, through detailed descriptions of the processes performed by the software and the data structures employed by the processes. It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

Because the proxy server shares multiple modems among the computer of a local area network, the number of phone lines, modems, and ISP accounts are greatly reduced while maintaining the benefits of using only the amount of bandwidth needed at one time associated with dial-up Internet accounts. Furthermore, the proxy server allows easy connections of new LAN computers to the Internet but without the overhead associated with a dedicated connection. Additionally, because the proxy server translates between non-registered LAN addresses and valid Internet addresses, the LAN is secured against unauthorized, external access.

What is claimed is:

1. A proxy server for use in connecting a wide area network with a plurality of client computers each having a local address, the proxy server comprising:

a local port connected to a local area network and operative for sending a plurality of incoming local packets and for receiving a plurality of outgoing local packets to and from the plurality of client computers;

a plurality of modems each having a modem port address and each connected to the wide area network, and operative for transmitting a plurality of outgoing remote packets and receiving a plurality of incoming remote packets; and a processor connected to the local port and connected to the plurality of modems, and operative for receiving one of the plurality of outgoing local packets from one of the plurality of client computers, for executing a load balancing algorithm and selecting one of the plurality of modems, for modifying the one of the plurality of outgoing local packets by substituting the modem port address of the selected modem for the local address of the one of the plurality of client computers to produce one of the plurality of outgoing remote packets, and for transmitting the one of the plurality of outgoing remote packets to the selected modem for transmission to the wide area network.

2. The proxy server according to claim 1, wherein the processor is further operative for receiving one of the plurality of incoming remote packets from one of the plurality of modems, for determining a destination client computer, for substituting the local address of the destination client computer for the modem port address of the one of the plurality of modems specified in the one of the plurality of incoming remote packets to create one of the plurality of incoming local packets, and for transmitting the one of the plurality of incoming local packets to the destination client computer through the local port.

3. The proxy server of claim 1, wherein the processor selects one of the plurality of modems based on a protocol specified in the one of the plurality of outgoing local packets.

4. The proxy server of claim 2, wherein the processor determines the destination client computer using a descriptor table, the descriptor table comprising an entry for each of the plurality of client computers having an open connection to the wide area network through the proxy server.

5. The proxy server of claim 1, wherein the processor is further operative for selecting an application port, for substituting the selected application port for a client computer application source port specified in the one of the plurality of outgoing remote packets, for determining an application destination port on a destination client computer, and for substituting the application destination port on the destination client computer for a destination port specified in one of the plurality of incoming local packets.

6. The proxy server of claim 5, wherein the processor selects the application port from a group of unused remote application ports.

7. The proxy server of claim 5, wherein the processor determines the application destination port using a descriptor table, the descriptor table comprising an entry for each open application port on each client computer having an open connection to the wide area network through the proxy server.

8. The proxy server of claim 1, wherein the processor is further operative for classifying the one of the plurality of outgoing local packets and for ignoring the one of the plurality of outgoing local packet if the classification does not match an entry in a proxied application list.

9. The proxy server of claim 1, wherein the processor is further operative for monitoring packet activity on an open connection between one of the plurality of client computers and the wide area network and for closing the open connection if there is no packet activity for a specified time period.

10. The proxy server of claim 1, wherein the processor is further operative for dynamically assigning a local address to one of the plurality of client computers.

11. The proxy server of claim 1, wherein each of the plurality of modems operates in dial-out only mode.

12. The proxy server of claim 1, wherein one of the plurality of modems operates in dial-out and dial-in mode.

13. The proxy server of claim 12, wherein the one of the plurality of modems operates in dial-in mode until packet activity through the proxy server reaches a pre-determined amount.

14. The proxy server of claim 1, wherein at least two of the plurality of modems form a bonded channel in a coordinated multilink operation.

15. The proxy server of claim 1, wherein the processor is further operative for determining if an incoming remote packet contains a proxy server management command, processing the proxy server management command, and sending any resulting information in an outgoing remote packet.

16. A method of sharing a plurality of modems connected to a wide-area network among client computers of a local area network comprising:

creating a first entry in a descriptor list for each open connection between a client computer and a host computer on the wide area-network, the first entry including a first mapped port number;

generating an outgoing packet from the client computer, the outgoing packet including a first portion of data, corresponding to the first entry, and a source address, the first portion of data having a source port number;

comparing the first portion of data with each first entry in the descriptor list to find a first corresponding first entry;

if the first corresponding first entry is found, substituting the first mapped port number of the first corresponding first entry for the source port number;

selecting a modem from the plurality of modems using a load balancing algorithm;

substituting an address of the selected modem for the source address ; and transmitting the outgoing packet using the selected modem.

17. The method of claim 16, further comprising:

generating an incoming packet from the host computer, the incoming packet including a second portion of data, corresponding to the first entry, and a destination address, the second portion of data having a second mapped port number;

comparing the second portion of data with each first entry in the descriptor list to find a second corresponding first entry;

if the second corresponding first entry is found, substituting a client computer port number of the second corresponding first entry for the second mapped port number;

substituting a client computer address included in the second corresponding first entry for a destination address; and transmitting the incoming packet to the local area network.

18. The method of claim 16, further comprising:

creating a second entry in a proxied application list for each application in the local area network which originates data to be transmitted to the wide area network, the second entry including the source port number and a transport protocol;

inserting the transport protocol in the first portion of data; comparing the first portion of data with each second entry in the proxied application list to find a corresponding second entry; and if the corresponding second entry is found, proxying the outgoing packet.

19. A communication system, comprising;

a plurality of client computers on a local area network, each client computer having a unique local address to differentiate from other client computers ; and a proxy server comprising:

a local port connected to the local area network and operative for sending a plurality of incoming local packets to the plurality of client computers and for receiving a plurality of outgoing local packets from the plurality of client computers;

a plurality of modems connected to a wide area network, and operative for transmitting a plurality of outgoing remote packets and receiving a plurality of incoming remote packets, each modem having a unique modem port address to differentiate from other modems; and a processor connected to the local port and connected to the plurality of modems, and operative for receiving one of the plurality of outgoing local packets from one of the plurality of client computers, for executing a load balancing algorithm and selecting one of the plurality of modems, for modifying the one of the plurality of outgoing local packets by substituting the modem port address of the selected modem for the local address of the one of the plurality of client computers, to produce one of the plurality of outgoing remote packets, and for transmitting the one of the plurality of outgoing remote packets to the selected modem for transmission to the wide area network.

20. A method of communication, comprising:

receiving a request from a client computer to establish a connection to a remote server having a remote server address;

selecting a modem from a plurality of modems in response to the request using a load balancing algorithm;

receiving a local data packet from the client computer;

combining the remote server address and the local data packet to create a remote data packet; and sending the remote data packet to the remote server through the selected modem.

21. The method according to claim 20, further including:

creating an entry in a descriptor list for each open connection between a client computer on the local area network and a host computer on the wide area-network;

matching data in an outgoing packet from a client computer against the descriptor list;

substituting a mapped port in the matched entry for a source port in the outgoing packet;

selecting one of the modems;

substituting an address for the selected modem for a source address in the outgoing packet; and transmitting the outgoing packet to the modem.

* * * * *